United States Patent [19]

Scott

[11] 4,368,274

[45] Jan. 11, 1983

[54] METHOD FOR REMOVING ALUMINUM FROM POLYETHYLENE TERAPHTHALATE (PET) BOTTLE SCRAP

[75] Inventor: Paul T. Scott, Kinston, N.C.

[73] Assignee: E. I. Du Pont de Nemours and Company, Wilmington, Del.

[21] Appl. No.: 323,434

[22] Filed: Nov. 20, 1981

[51] Int. Cl.$^3$ .................................................. B08B 3/08
[52] U.S. Cl. ...................................... 521/48; 134/25.1; 134/42; 264/37; 264/DIG. 69
[58] Field of Search ................................ 134/25.1, 42; 264/DIG. 69, 37, 169, 344; 521/48

[56] References Cited

U.S. PATENT DOCUMENTS

| | | | |
|---|---|---|---|
| 3,503,904 | 3/1970 | Dietz et al. | 134/42 X |
| 3,516,841 | 6/1970 | Haveman | 521/48 X |
| 4,033,804 | 7/1977 | Baldyga | 264/DIG. 69 X |
| 4,073,661 | 2/1978 | Buzga et al. | 134/25.1 X |
| 4,138,534 | 2/1979 | Tedesco | 264/DIG. 69 X |

*Primary Examiner*—Marc L. Caroff
*Attorney, Agent, or Firm*—William H. Thrower

[57] ABSTRACT

A method for removing aluminum from PET bottle scrap flakes comprises:
(1) mixing the scrap flakes with a solution containing a chemical that reacts with aluminum such that the aluminum in the scrap will completely dissolve into the solution; then
(2) decanting off the solution with the aluminum dissolved in it, so as to leave behind PET flake; and finally
(3) washing the PET flake.

2 Claims, No Drawings

METHOD FOR REMOVING ALUMINUM FROM POLYETHYLENE TERAPHTHALATE (PET) BOTTLE SCRAP

BACKGROUND OF THE INVENTION

Environmental concern has spurred interest in recycling many materials of manufacture. This recycling serves many useful purposes. One, it helps to conserve natural resources. Two, it also provides a way to productively deal with the huge quantity of waste generated today.

Well-known recycling programs include reclaiming paper from used newspapers and aluminum from used beer and soft drink cans.

Polyethylene teraphthalate (PET) has been widely used in the soft drink industry as a material for making soda bottles. Due to the popularity of using PET to manufacture soft drink bottles, there is already a large volume of PET bottle scrap available. Furthermore, the amount is expected to increase each year, especially as more states join those states that have already passed laws requiring a deposit on PET bottles so as to encourage their return.

However, there are difficulties with reclaiming PET scrap from used PET bottles. Often, the bottles have been ground to flake, which contains not only PET, but also may contain such contaminants as paper, polyethylene, ethylvinyl acetate from glue, paint, and aluminum from bottle caps. Many methods for removing these contaminants exist. For example, the paper can be removed by an air-fluidized bed and the polyethylene can be removed by a flotation process using water. As for the aluminum, one known method for its removal utilizes hydrocyclone separators. The aluminum content of the scrap can only be reduced by such a process to about 0.05% by weight of the scrap. Moreover, in order to accomplish this, about 50% of the PET flake is lost. Such a yield makes PET flake reclaimed from bottle scrap more expensive than virgin "2GT" flake.

The present invention provides for a different method of removing aluminum from PET bottle scrap.

SUMMARY OF THE INVENTION

A method for removing aluminum from PET bottle scrap flakes comprises:
(1) mixing the scrap flakes with a solution containing a chemical that reacts with aluminum such that the aluminum in the scrap will completely dissolve into the solution; then
(2) decanting off the solution with the aluminum dissolved in it, so as to leave behind PET flake; and finally
(3) washing the PET flake.

DETAILED DESCRIPTION OF THE INVENTION

As noted earlier, PET bottle scrap is often ground to flake, which contains not only PET, but may also contain paper, polyethylene, ethylvinyl acetate from glue, paint, and aluminum from bottle caps. The present invention provides for a method of removing aluminum from the PET bottle scrap.

The method comprises:
(1) mixing the scrap flakes with a solution containing a chemical that reacts with aluminum such that the aluminum in the scrap will completely dissolve into the solution; then
(2) decanting off the solution with the aluminum dissolved in it, so as to leave behind PET flake; and finally
(3) washing the PET flake.

In the method, the chemical in solution that is reacted with the aluminum to dissolve it, is preferably sodium hydroxide (NaOH). However, other chemicals could be used.

The concentration of sodium hydroxide (or other chemical that reacts with aluminum in the manner described) should be such that there is enough of the chemical to completely dissolve any aluminum in the scrap flake. However, for practical purposes, the concentration should be such that the reaction between the aluminum and, for example, sodium hydroxide proceeds at a rate deemed desirable by the practitioner of the method. Such a preferred concentration should be easily determined by one skilled in the art. There is no upper limit on the concentration of NaOH in solution.

The sodium hydroxide, or other chemical, will normally be in an aqeuous solution, however any solvent that does not otherwise interfere with the reaction between the sodium hydroxide and aluminum, is contemplated.

The invention is further understood by the following example. (All percentages and proportions herein are by weight except where indicated otherwise.)

EXAMPLE

PET bottle scrap flake (containing about 0.1 to 0.05% by weight, based on the total weight of the bottle flake, of aluminum) was mixed with an aqueous 10% solution of NaOH at about 35° C. for $5\frac{1}{2}$ hours. The solution was then decanted off, leaving behind PET flake, which was then washed several times with water. The PET flake was then dried in a vacuum oven and subsequently spun on a screw melter to give polyester fibers. After $2\frac{1}{4}$ hours of spinning, the sand pack of the screw melter was removed and no aluminum was found in the pack, thereby indicating that the aluminum had been completely removed from the PET scrap flake. Furthermore, pack pressure only increased during the $2\frac{1}{4}$ hours spinning time from 1300 psi to 2100 psi. Flake containing 0.1 to 0.05% by weight aluminum and not treated by the method of this invention is unacceptable for screw melt spinning due to the excessively rapid buildup of pack pressure caused by aluminum contamination.

What is claimed is:
1. In a method for removing aluminum from PET bottle scrap flakes, the improvement which comprises:
   (a) mixing the scrap flakes with a solution containing a chemical that reacts with aluminum, the chemical being at a sufficient concentration and in contact with the scrap at a sufficient temperature and for a sufficient time to completely dissolve the aluminum in the scrap into the solution; then
   (b) decanting off the solution with the aluminum dissolved in it, so as to leave behind PET flake; and finally
   (c) washing the PET flake.
2. A method as recited in claim 1 wherein the chemical in solution that is reacted with the aluminum so as to dissolve it completely, is sodium hydroxide.

* * * * *